(12) United States Patent
Tschirhart et al.

(10) Patent No.: US 11,275,712 B2
(45) Date of Patent: Mar. 15, 2022

(54) SIMD CONTROLLER AND SIMD PREDICATION SCHEME

(71) Applicant: Northrop Grumman Systems Corporation, Falls Church, VA (US)

(72) Inventors: Paul Kenton Tschirhart, Odenton, MD (US); Brian Konigsburg, Pasadena, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/998,186

(22) Filed: Aug. 20, 2020

(65) Prior Publication Data

US 2021/0056069 A1 Feb. 25, 2021

Related U.S. Application Data

(60) Provisional application No. 62/889,265, filed on Aug. 20, 2019.

(51) Int. Cl.
| | |
|---|---|
| *G06F 15/80* | (2006.01) |
| *G06F 9/30* | (2018.01) |
| *G06F 9/38* | (2018.01) |

(52) U.S. Cl.
CPC ...... *G06F 15/8007* (2013.01); *G06F 9/30018* (2013.01); *G06F 9/30101* (2013.01); *G06F 9/30185* (2013.01); *G06F 9/3887* (2013.01)

(58) Field of Classification Search
None
See application file for complete search history.

(56) References Cited

U.S. PATENT DOCUMENTS

| | | | |
|---|---|---|---|
| 6,505,345 B1 * | 1/2003 | Chen | G06F 8/4451 712/216 |
| 6,910,123 B1 | 6/2005 | Bosshart | |

(Continued)

OTHER PUBLICATIONS

Paar, A., etal.., A Novel Predication Scheme for a SIMD System-on-Chip.2002. Springer-Verlag, Euro-Par 2002 pp. 834-843. (Year: 2002).*

(Continued)

*Primary Examiner* — Eric Coleman
(74) *Attorney, Agent, or Firm* — Edell, Shapiro & Finnan, LLC (57) ABSTRACT

In an embodiment, a method for processing data in a single instruction multiple data (SIMD) computer architecture is provided. A processing element (PE) may determine based on a masking instruction, a predication state indicative of one of a conditional predication mode and an absolute predication mode. The PE may receive a predicated instruction and, based on a value of a head bit of the bits of a predication mask and on the value indicative of the predication state whether to commit a computation corresponding to execution of the predicated instruction. In another embodiment, a SIMD controller stores loops and sections of a program as a separate instruction stream record for generating the memory address of the next instruction. For data streams, the SIMD controller records information for each data memory access that references the same register files that are used by the instruction streams.

18 Claims, 7 Drawing Sheets

(56) References Cited

U.S. PATENT DOCUMENTS

| | | |
|---|---|---|
| 7,178,011 B2 | 2/2007 | Seal et al. |
| 7,506,136 B2 | 3/2009 | Stuttard et al. |
| 7,818,539 B2 | 10/2010 | Rixner et al. |
| 7,877,585 B1 | 1/2011 | Coon et al. |
| 9,557,993 B2 | 1/2017 | Sanghai et al. |
| 9,619,234 B2 | 4/2017 | Muff et al. |
| 9,904,546 B2 | 2/2018 | Iyer et al. |
| 10,318,293 B2* | 6/2019 | Anderson ............. G06F 9/3867 |
| 2004/0187040 A1* | 9/2004 | Sasagawa ............. G06F 1/3243 713/300 |
| 2006/0224867 A1* | 10/2006 | Tran ............. G06F 9/3844 712/226 |
| 2006/0248281 A1* | 11/2006 | Al-Sukhni ............. G06F 9/3832 711/137 |
| 2009/0235051 A1* | 9/2009 | Codrescu ............. G06F 9/30036 712/205 |
| 2013/0159675 A1* | 6/2013 | Muff ............. G06F 9/3802 712/208 |
| 2013/0198491 A1* | 8/2013 | Busaba ............. G06F 9/30145 712/208 |
| 2014/0258695 A1* | 9/2014 | Rajwar ............. G06F 9/38 712/234 |
| 2014/0300614 A1* | 10/2014 | Nalluri ............. G06F 9/30072 345/522 |
| 2015/0149747 A1* | 5/2015 | Lee ............. G06F 8/4452 712/241 |
| 2015/0154024 A1 | 6/2015 | Anderson |
| 2015/0378741 A1 | 12/2015 | Lukyanov |
| 2018/0032344 A1* | 2/2018 | Smith ............. G06F 9/3834 |
| 2019/0095209 A1* | 3/2019 | Grant ............. G06F 9/3005 |

OTHER PUBLICATIONS

Carter, L. etal., Path Analysis and Renaming for Predicated Instruction Scheduling, 2000, Plenum Publishing, pp. 563-588. (Year: 2000).*

Ashmawy, A. M. M. etal. Hybrid Predication Model for Instruction Level Parallelism, 2002, IEEE, 8 pages. (Year: 2002).*

International Search Report and Written Opinion received in international application No. PCT/US20/47107, dated Nov. 23, 2020 (17 pages).

* cited by examiner

SIMD CONTROLLER AND SIMD PREDICATION SCHEME

CROSS-REFERENCE TO RELATED APPLICATIONS

This application claims priority to U.S. Provisional Patent Application Ser. No. 62/889,265, filed Aug. 20, 2019 and entitled "SIMD Controller and SIMD Predication Scheme", the entirety of which is incorporated herein by reference.

GOVERNMENT RIGHTS

This invention was made with government support under Office of the Director of National Intelligence, Intelligence Advanced Research Projects Activity, Contract No. W911NF-14-C-0116. The United States Government has certain rights in the invention.

SUMMARY OF THE INVENTION

In accordance with a first aspect of the invention, a method for processing data in a single instruction multiple data (SIMD) computer architecture that supports if-else-based program structures and loop-based program structures is provided. In an embodiment, the method comprises: receiving at a processing element a masking instruction that includes a predication mask including a plurality of bits associated with a plurality of predicated instructions following the masking instruction; determining by the processing element, based on the masking instruction, a predication state indicative of one of a conditional predication mode and an absolute predication mode; storing in a predication mask register the predication mask; storing in a predication state register a value indicative of the predication state; receiving at the processing element a first predicated instruction of the plurality of predicated instructions; and determining by the processing element, based on a value of a head bit of the plurality of bits of the predication mask stored in the predication state register and on the value indicative of the predication state stored in the predication state register, whether to commit a computation corresponding to execution of the first predicated instruction.

In accordance with a second aspect of the invention, a SIMD controller is provided. In an embodiment, the SIMD controller comprises: a plurality of registers, each register configured to store a value used in determining at least one of an instruction memory address at which an instruction is stored or a data memory address at which data corresponding to the instruction is stored; a data memory communicatively coupled to the plurality of registers and configured to store a plurality of data address records, each data address record comprising a program counter and a plurality of register addresses each identifying a corresponding one of the plurality of registers that stores a value used to determine a data memory address; and an instruction address stream memory communicatively coupled to the plurality of registers and configured to store a plurality of instruction address streams associated with at least one instruction of a program, each instruction address stream comprising a plurality of register addresses each identifying a corresponding one of the plurality of registers that stores a value used to determine a instruction memory address storing the associated instruction.

BRIEF DESCRIPTION OF THE DRAWINGS

Example embodiments of the invention are described herein with reference to the accompanying drawing figures, in which like reference numerals in the various figures are utilized to designate like components, and in which.

DESCRIPTION OF EXAMPLE EMBODIMENTS

With respect to a first aspect of the invention, methods and hardware for processing data in a single instruction multiple data (SIMD) computer architecture that supports if-else-based program structures and loop-based program structures is provided. As described in greater detail below, example embodiments enable a common set of hardware to be used in supporting both if-else program structures without branch instructions and variable loop count program structures.

At least some example embodiments described herein provide a set of processor instructions and supporting hardware that efficiently enables the selective commit of instructions in a single instruction multiple data (SIMD) system. The selective commit allows the SIMD system to support if-else and variable loop count program structures without branch instructions. The same hardware structures may enable loop control across the processing elements (PEs) of the SIMD system and if-else program structures without branch instructions.

Example embodiments may efficiently enable more complex program structures to be employed in a SIMD system. The functionality may be used to implement if-else program structures without the need for branch instructions, which can introduce pipeline hazards and negatively impact performance. Similarly, the functionality can also be used to spread loop iterations across the SIMD system even when the number of iterations does not match or divide evenly into the number of processing elements in the system. This allows the same program to be used by all processing elements, which may greatly simplify the compilation process for the SIMD system. This also allows for the use of a single instruction memory that is shared by all the PEs, which may greatly simplify the SIMD system.

Generally, predicated instructions allow for implementation of if-else structures in a program without the need for a branch. Both paths of instructions after the branch are executed by the machine; only those instructions that are marked correctly are actually written back/committed, and the other results are discarded. This is referred to as conditional predication because the instruction will or will not be written back based on the result of some condition being met.

PEs in a SIMD system perform parallel computations in the SIMD system. However, the number of parallel calculations or loop iterations might not evenly fit on the number of PEs. In other words, the number of parallel calculations or loop iterations may not be able to be evenly distributed to the number of PEs. In such a scenario, to perform all of the parallel calculations or loop iterations, some PEs would be tasked with handling more instructions than other PEs. For example, if a loop has ten iterations and there are three PEs to perform the iterations of the loop, then the three PEs would not be able to handle the same number of iterations, as three does not divide into ten evenly. As an example, the ten iterations could be divided so that one of the three PEs handles four iterations and the other two PEs handle three iterations each. By predicating the instructions, the write back of the instructions can be disabled on some PEs while being allowed on others. In this way, the work can be distributed across the PEs without needing to provide a specific program for each PE. We refer to this as absolute predication because the instructions are written back or not based on a predication value and not on a condition.

There are other ways to use the conditional and absolute predication enabled by the proposed invention besides the examples provided above. For example, additionally or alternatively, the condition and absolute predication may be used for while loop and/or for loop program structures.

Example embodiments support predication through the use of a single bit in each instruction, a state register, a mask register, and a set of compare instructions. The single bit in each instruction indicates whether the instruction should be predicated or not. In this way, the proposed invention allows predicated and non-predicated instructions to be efficiently mixed. The predication state register is set by instructions and determines whether the processor is in conditional or absolute predication mode. The mask register is also loaded by instructions and stores a series of single bits that indicate how predicated instructions should be treated by the processor.

In absolute predication mode, if the head of the mask is 'false' then the next predicated instruction will not be written back, and if it the head of the mask is 'true' then the next predicated instruction will be written back. As such, in absolute predication mode, the value of the head of the mask may determine whether or not an ALU result will be written back. In conditional predication mode, the head of the mask register and the result of the last compare instruction are to match in order for the next predicated instruction to be written back. For example, if the result of a previous compare instruction was 'true' and the head bit of the predication mask is also 'true,' then the result is written back. Similarly, if the result of the previous compare was 'false' and the current predication mask bit is 'false,' then the result is written back. However, if the compare result and the predication mask bit do not match (one is 'false' and the other is 'true'), then the result is not written back.

After each predicated instruction is completed, the head of the predication mask is removed and the contents shifted up so that each predicated instruction uses a unique bit in the mask. Non-predicated instructions do not affect the mask.

Example embodiments rely on a separate compare instruction to set the predication condition and use the additional bits to predicate a larger number of following instructions. The separate compare instruction also allows the same predication mask to be used for multiple conditions, whereas some conventional approaches use a new mask for each condition. Example embodiments may use a single bit in each instruction to indicate whether it is predicated or not. This means that the predication mask can be set less often because it is only used when predicated instructions are encountered rather than for the next sequential number of instructions as at least one conventional approach does.

Example embodiments do not require use of a set of predication registers as some conventional approaches do. Example embodiments use compare instructions to generate the value that determines conditional predication.

Conventional approaches do not reuse the same hardware to control both loops and branches as described herein. As such, conventional approaches are not as efficient to implement in terms of hardware and memory as the embodiments described herein.

It may be desirable to support complex program structures without including a branch instruction in order to maximize the performance and flexibility of a SIMD system.

Limited memory resources (e.g., with respect to useable or available memory, or area) in computer systems may mean that most typical predication approaches are unacceptable because they require too many bits in an instruction word or special registers to store the predication values.

Example embodiments may be employed/implemented in a variety of systems where memory or area are limited. For example, example embodiments may be useful in CMOS applications which have area limitations that can benefit from additional efficiency.

Efficient implementations of predication may be desirable in superconducting processors for the foreseeable future in order to maximize performance until sufficient memory capacity is available to support complex and highly accurate branch prediction units.

Example embodiments may reduce the complexity of the compiler because only one version of the program needs to be compiled for all of the PEs in the SIMD system.

Example embodiments may improve performance with minimal additional hardware (compared to supporting branches).

Example embodiments may remove the need for a dedicated instruction memory for each processing element in the system. This may greatly reduce the number of chips that are needed to implement a SIMD system (e.g., in RQL or a similar technology, CMOS, and/or any other suitable implementation).

In an example embodiment, a 9-bit predication mask may be used that only applies to specifically marked instructions. However, 9-bits is only an example number of bits that may be used for the predication mask, and the predication mask is not to be limited to 9 bits. It is to be understood that any suitable number of bits may be used for the predication mask.

All instructions may be predicated including the predication instructions which allows for more complex program structures.

Example embodiments may support both loop control and if-else blocks with the same hardware structures which is much more efficient. For example, the same mask register may be used for both predication modes.

Example embodiments may provide much more flexibility to the user and make more efficient use of memory and instructions.

Figure 1:
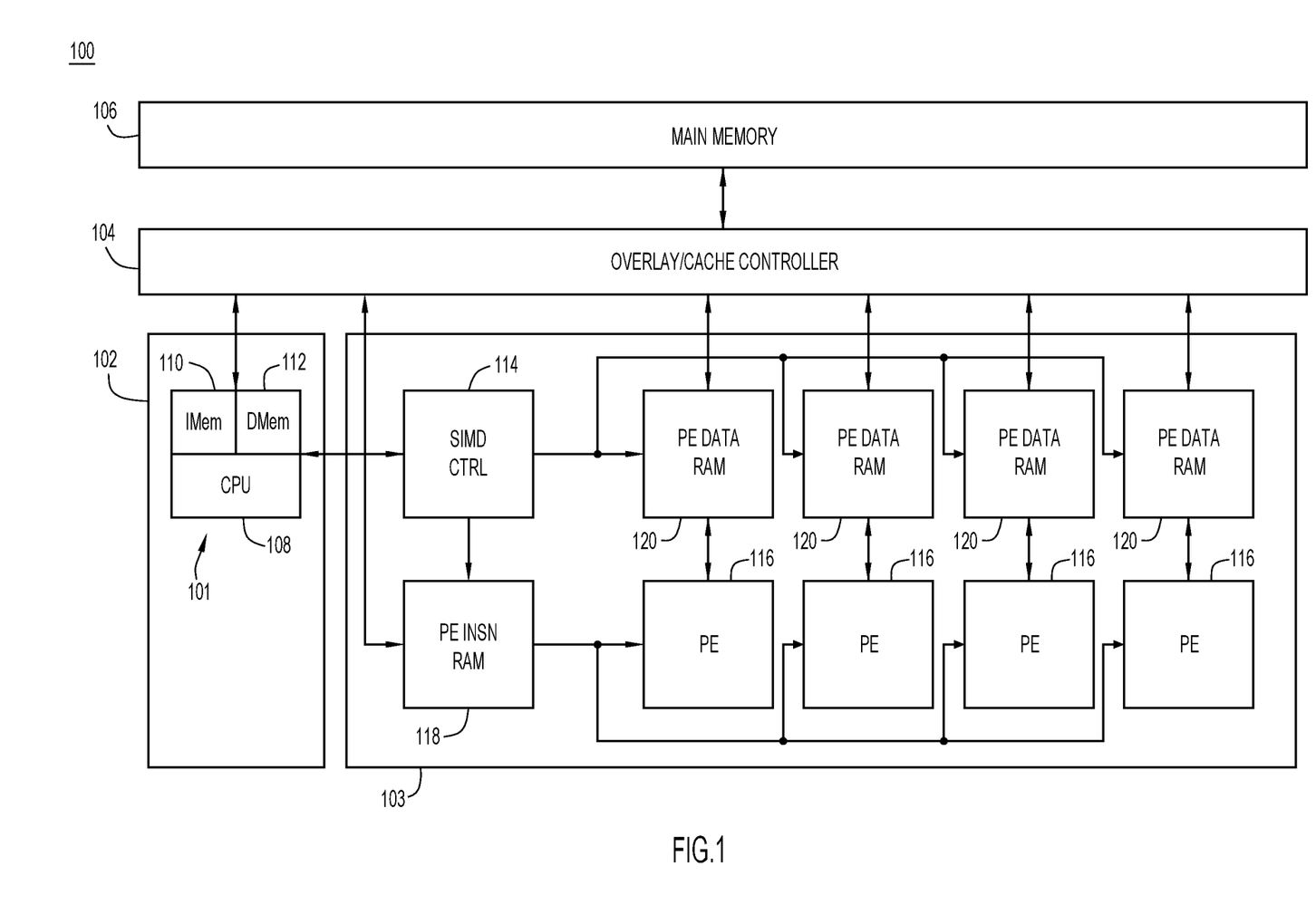
FIG. 1 is a schematic block diagram of a computer system, according to an example embodiment.

FIG. 1 is a schematic block diagram of a computer system 100. The computer system 100 includes a processor 102, an overlay/cache controller 104, and a main memory 106. The processor 102 may include a central processing unit (CPU) 108, an instruction memory (IMem) 110, a data memory (DMem) 112, a SIMD controller 114, a plurality of processing elements (PEs) 116, a PE instruction memory (shown as PE Insn RAM) 118, and a plurality of PE data memories (shown as PE Data RAM) 120. In an example embodiment, the CPU 108, the instruction memory 110, and the data memory 112 may form a data processing subsystem 101 for execution of non-SIMD portions of a program, if any, whereas the SIMD controller 114, the PEs 116, the PE instruction memory 118, and the PE data memories 120 form a data processing subsystem 103 for execution of SIMD portions of a program. The data processing subsystem 101 and/or the data processing subsystem 103 may be multi-chip modules (MCMs). Addresses that are going to the data and instruction memories may be generated by the SIMD controller 114. The PEs may receive its respective data from the memory in a just-in-time fashion. The SIMD controller 500 shown in FIG. 5 or the SIMD controller 600 shown in FIG. 6 are examples of controllers that can be used as SIMD controller 114 in FIG. 1, although other SIMD controllers can be used.

Figure 2:
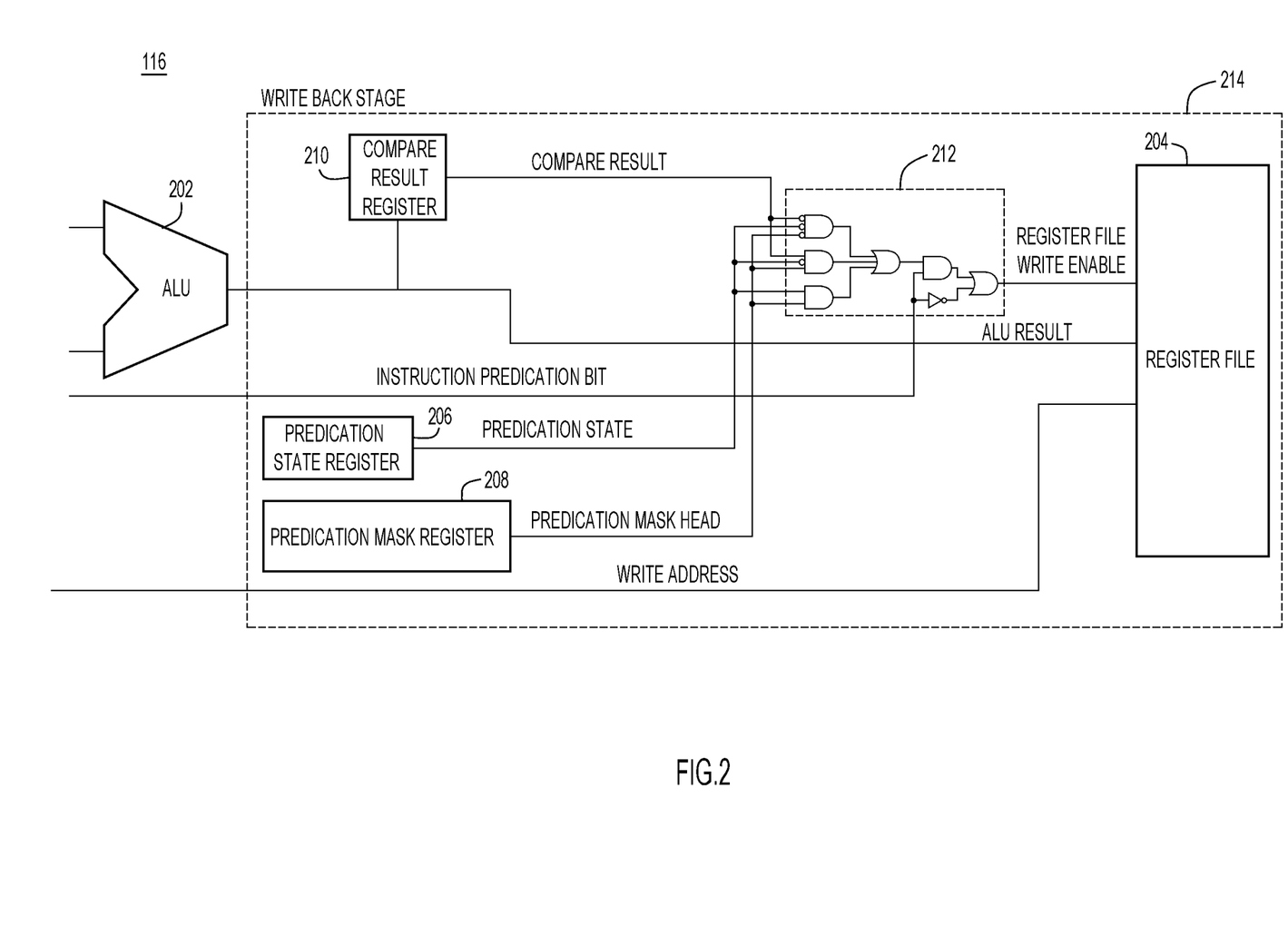
FIG. 2 is a schematic block diagram of a processing element (PE), according to an example embodiment.

FIG. 2 illustrates a block diagram of a PE 116, according to an example embodiment. The PE 116 includes an arithmetic logic unit (ALU) 202, a register file 204, a predication state register 206, a predication mask register 208, a compare result register 210, and register file write enable logic 212. The register file 204, the predication state register 206, the predication mask register 208, the compare result register 210, and the register file write enable logic 212 may be used in a write back stage 214 of a data path pipeline. The ALU 202 may provide a result of an operation to the write back stage 214, and a determination may be made as to whether the register file 204 is to commit the ALU result. One or more other stages of the data path pipeline may be performed entirely or in part by additional elements of the PE 116 not shown in FIG. 2.

The predication state register 206 stores a predication state of the PE 116. For example, the predication state register 206 may store a value indicative of whether the PE 116 is in conditional predication mode or absolute predication mode. For example, the predication state register 206 may store a first value (e.g., a value of '0') for conditional predication mode and a second value (e.g., a value of '1') for absolute predication mode. The predication state register 206 may be loaded with the predication state by one or more instructions. For example, an instruction may have a first opcode of a first value that corresponds to conditional predication mode, and an instruction may have a second opcode of a second value that corresponds to absolute predication mode. In other words, different opcodes may be used in instructions to indicate whether the predication state register 206 is to be loaded with a value indicative of conditional predication mode or absolute predication mode.

The predication mask register 208 stores a predication mask. The predication mask may determine the commit conditions for a number of following predicated instructions. The same instruction from which the predication state is determined may be used to determine the predication mask. The predication mask may be a series of single bits (e.g., a series of 'n' single bits, where 'n' is any suitable integer greater than or equal to 1) having values based on which the result of a corresponding instruction is committed or not. For example, for absolute mode, if the head of the predication mask is a value of 'true,' then the register file write is enabled so that the result may be committed to the register file 204. For conditional mode, if the head of the predication mask and the result from the compare result register 210 are logically the same (e.g., both are logically 'true' or both are logically 'false'), then the register file write is enabled so that the ALU result may be written to the register file 204. The predication mask register 208 may be loaded with the predication mask when a masking instruction is committed, as the masking instruction itself could be a predicated instruction.

The register file write enable logic 212 may include any suitable logic circuit(s) to determine, based on the instruction predication bit, the predication state, the predication mask (the head of the predication mask), and/or the compare result whether to enable the register file write for the register file 204 to commit the ALU result. Based on the values from these registers and the logic, the register file 204 will or will not commit the ALU result. In the example implementation shown, the predication mask head (e.g., the leading bit of the predication mask register 208) and the predication state may be logically ANDed together. The predication mask head, the inverse of the predication state, and the compare result may be logically ANDed together. The inverse of the compare result (dot represents an invert operation or an inverter), the inverse of the predication state, and the inverse of the predication mask head may be logically ANDed together. The results of the three logical ANDs may be logically ORed together. The output of the logical OR may determine whether the register file write is enabled or not. As shown in FIG. 2, the output of the logical OR is an input to a logical AND, which has the instruction predication bit (the bit indicating whether the instruction itself is predicated) as another input. The instruction predication bit is also an input to an inverter operation (shown as being performed by the inverter). The output of this logical AND and the output of the inverter operation are inputs to a logical OR. The output of the logical OR determines whether the register file write enable is enabled or not.

In an example embodiment, whether an instruction is predicated is determined from a single bit in each instruction. Some instructions are not predicated. As an example for a 16-bit processor (processing element), an instruction format for a masking instruction may include 6 bits for an opcode, 1 bit for whether the masking instruction itself is predicated, and 9 bits for a predication mask. As a further example, an opcode of 12 may correspond to a masking instruction in a conditional predication mode and an opcode of 13 may correspond to a masking instruction in an absolute predication mode. It is to be understand that the processing elements are not limited to being 16-bit processors and may be configured to operate on any suitable number of bits. It should also be understood that one or more of the PEs 116 may take the form of a processor including a register file and without an instruction memory, a data memory, or program flow control. It should further be understood that one or more of the PEs 116 may take the form of a processor configured for relatively high throughput. Furthermore, it should be understood that other PEs can additionally or alternatively be used, including processing elements that include fewer, additional, and/or different components.

The ALU 202 may perform any suitable operation (e.g., arithmetic operations, logic operations, etc.) on data (operands). The ALU 202 may have at least one input for data and at least one input for a code indicating the operation to be performed on data that is input. The ALU 202 may have an output that is the result of the operation performed on the data. The ALU result may be provided to the compare result register 210 and the register file 204. If the ALU result is the result of a compare instruction, then the ALU result (compare result) is provided to the compare result register. In other words, the compare result register 210 may only be loaded by compare instructions. Whether the ALU result is committed to the register file 204 depends on whether the register file write is enabled or not, which is dependent on the value of the instruction predication bit, the value of the predication state, the value of the predication mask head, and/or the value of the compare result.

In an example embodiment, a single instruction sets the predication mask and sets the predication state. For example, a particular instruction may be called, and the opcode of the instruction indicates whether the instruction is an absolute predication instruction or a conditional predication instruction, which determines whether the predication state gets set to a first value or a second value. For example, if an opcode of 12 corresponds to absolute predication instructions and an opcode of 13 corresponds to conditional predication instructions, and the instruction has an opcode of 12, then the predication state may get set to a '1', whereas if the instruction has an opcode of 13, then predication state may get set to a '0'. The predication mask may be included as bits of the instruction.

It is to be understood that the processing element 116 includes additional elements and functionality not explicitly shown in FIG. 2 for the sake of simplicity and clarity.

Figure 3:
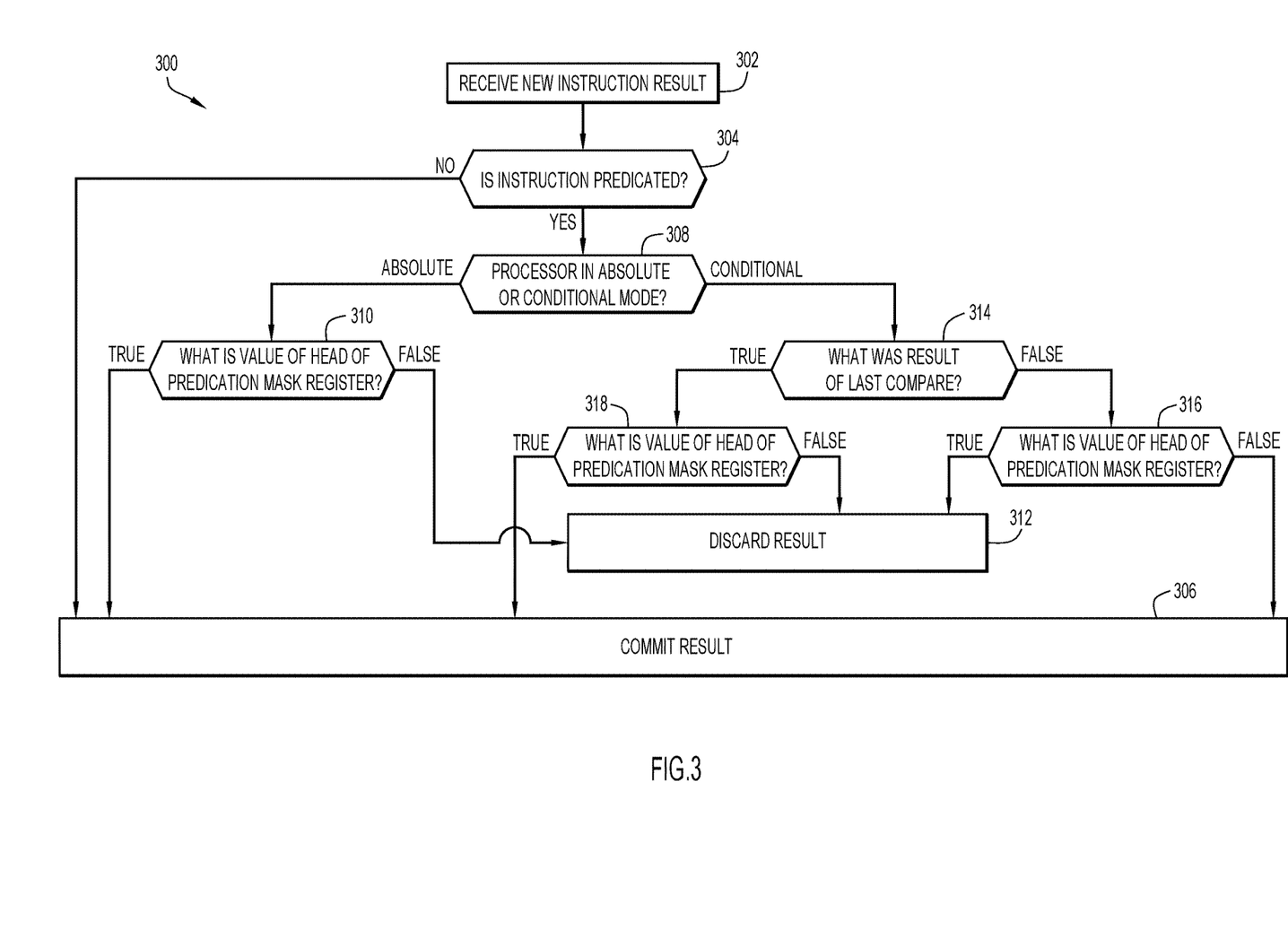
FIG. 3 is a flowchart illustrating a method for processing data in a single instruction multiple data (SIMD) computer architecture that supports if-else-based program structures and loop-based program structures, according to an example embodiment.

FIG. 3 is a flowchart of a method 300 for processing data in a SIMD computer architecture that supports if-else-based program structures and loop-based program structures, according to an example embodiment. The method 300 may be performed by a PE (e.g., PE 116). At 302, an instruction result (shown as new instruction result) is received by a register file (e.g., register file 204) of a processor (e.g., PE 116). The instruction result may be generated by an ALU of the processor (e.g., ALU 202 of PE 116). The ALU may perform a data processing operation on data values in accordance with an instruction to generate the instruction result, which may or may not be written back (committed) to the register file. The ALU may perform the data processing operation during an execution stage of an instruction pipeline, which, as known in the art, may be after instruction fetch and decode stages of the instruction pipeline. For example, if the instruction is predicated and the condition associated with the predicated instruction is not satisfied, then the new instruction result may not be written back. Whether the instruction result is written to the register file may be based on a write enable value that is generated by register file write enable logic (e.g., register file write enable logic 212).

At 304, the processing element determines whether the instruction is predicated. For example, a single bit in the instruction may indicate whether the instruction is predicated. For example, if the instruction is predicated then the single bit in the instruction may be a first value (e.g., a value of '1'), and if the instruction is not predicated then the single bit in the instruction may be a second value (e.g., a value of '0'). In order to determine the value of this single bit, the instruction may be fetched and decoded. If the instruction is not predicated (if the value of the single bit in the instruction indicates that the instruction is not predicated), then the method 300 continues to 306 where the result is committed. If the instruction is predicated (if the value of the single bit in the instruction indicates that the instruction is predicated), then the method 300 continues to 308 where the processor determines whether it is in conditional predication mode or absolute predication mode.

If the processor is in absolute predication mode (if at 308 it is determined that the processor is in absolute predication mode), the method 300 continues to 310 where the processor determines the value of the head of a predication mask register of the processor. If at 310 the value of the head of the predication mask register is 'true', then the method 300 continues to 306 where the result is committed. If at 310 the value of the head of the predication mask register is 'false,' then the method 300 continues to 312 where the result is discarded.

If the processor is in conditional predication mode (if at 308 it is determined that the processor is in conditional predication mode), the method 300 continues to 314 where the processor determines the result of the last compare. If at 314 the result of the last compare is 'false', then the method 300 continues to 316 where the processor determines the value of the head of the predication mask register. If at 316 the value of the head of the predication mask register is 'true', then the method 300 continues to 312 where the new instruction result is discarded. If at 316 the value of the head of the predication mask register is 'false', then the method 300 continues to 306 where the result is committed. If at 314 the result of the last compare is 'true', then the method 300 continues to 318 where the processor determines the value of the head of the predication mask register. If at 318 the value of the head of the predication mask register is 'true,' then the method 300 continues to 306 where the result is committed. If at 318 the value of the head of the predication mask register is 'false,' then the method 300 continues to 312 where the result is discarded.

The predication mask register allows for predication of instructions with a single bit. Use of data structures in the PE 116 may allow for using less bits in the instruction, and with a lower number of bits in the instruction, more efficient encoding of the instructions may be possible. In an example embodiment, a single bit in an instruction indicates whether or not the instruction should be treated as predicated, and the predication mask register and the predication state register are used to fill in other information based on which a determination may be made as whether to commit the result of the instruction. Whether the predication mask head is a first value (e.g., a value of '1') or a second value (e.g., a value of '0') determines what is going on with the predication. In other words, if in conditional predication mode, the bit indicates whether the instruction is predicated on the true or false result of the condition (e.g., if the mask is '1' and the condition is 'true,' then instruction result is committed, if the mask is '0' and the condition is 'false,' then instruction result is committed). In conditional predication mode, the mask allows an instruction to be committed on the true or false result of the condition by loading the mask to a particular value. In absolute predication mode, the mask allows an instruction to be committed by loading the mask to a particular value (e.g., without considering a result of a condition like in conditional predication mode.) In other words, in absolute predication mode, the value of the mask alone can determine whether the result is committed or not (e.g., if the mask is '1' then the instruction result is committed, if the mask is '0' then the instruction result is not committed).

In an example, the processor (e.g., PE 116) is in absolute mode and there is a loop that is to be executed ten times using three SIMD units (PEs). In other words, ten iterations of a loop are to be done across three PEs. Example embodiments may be employed to avoid implementing a separate version of the program, and instead the same program is able to be reused for each SIMD unit, with a separate predication mask for each SIMD unit that is loaded from data. It is desirable to reuse the program for each of the SIMD units.

In absolute mode, a common program is allowed to be used for all of the SIMD units, even when the number of loop iterations is not a multiple of the number of SIMD units, which may otherwise be problematic. One PE can commit four iterations and the other two PEs can commit three iterations, resulting in a total of ten iteration results being committed. This is enabled by the predication mask. On the last iteration, the two PEs that commit three of the four times will have a '0' at the head of the predication mask and thus will not commit the result. The PE with a '1' at the head of the predication mask on the last iteration will commit the result. All three PEs will do the instruction four times, but the two PEs with the predication mask 0111 (if the head is the least significant bit) or 1110 (if the head is the most significant bit) will commit three results and the PE with the predication mask 1111 will commit four results.

A compare instruction (e.g., greater than, greater than or equal to, less than, less than or equal to, equal to, etc.) sets the compare result register.

Instructions that should be predicated will have a specific bit set in their instruction word. This bit tells the register file that the result of the instruction should only be written if certain conditions are met.

For example, if the result of a previous compare instruction was true and the current predication mask bit is also true, then the result is written back. Similarly, if the result of the previous compare was false and the current predication mask bit is false, the result is written back. However, if the compare result and the predication mask bit don't match, then the result is not written back. In this way, an if-else structure may be implemented that is conditioned by a compare. After each predicated instruction is completed, the head of the predication mask is removed and the contents shifted up so that each predicated instruction uses a unique bit in the mask.

In an example embodiment, an instruction format includes 6 bits for the opcode, 1 bit for the predication instruction bit, and 9 bits for the predication mask. Whether an instruction is predicated at all comes from a single bit in each instruction. The predication mask may be set with the instruction. The instruction may have a condition (e.g., a comparison) and it may be predicated.

A common set of hardware may be employed, which may result in reusing the same mask register for both loop and if/else program structures.

Memory is expensive in particular technologies, so extra bits in instructions are generally not desirable (e.g., like an ARM processor). Fewer bits in the instruction may therefore be desirable. Having a bunch of banks of registers to store information or data on a processor is generally also not desirable. A more memory efficient approach is generally more desirable.

Embodiments of a second aspect of the present invention relate to a controller of a SIMD system. Example embodiments may include hardware for a SIMD controller that directs the operation of a SIMD array of processing elements (PEs) by determining which instructions and data are received by the processing elements. More specifically, example embodiments may determine the instructions and data that are sent during each clock cycle by reconstructing memory address streams from efficiently encoded records. The SIMD controller may efficiently encode memory address stream patterns, which may reduce the amount of memory needed for storing the instruction and data address streams that are needed by a program.

Example embodiments may control the operation of a SIMD array of PEs by generating the instruction and data addresses used by the memories of each PE. Each PE may receive data from its own data memory, whereas each PE may receive instructions from an instruction memory shared among the PEs. To generate the addresses, the streams of instructions and data are stored in a compact fashion, for example, due to memory capacity restrictions. The controller may build the instruction and data addresses from a common set of registers.

The SIMD controller may coordinate the just-in-time delivery of instruction and data words to each PE of the SIMD system. Computations performed by the SIMD system are coordinated across multiple PEs. In order to coordinate the computation across multiple PEs, the correct address for each instruction or data word is activated at the correct time for each PE. Generating these addresses and activations for the instruction and data memories of each PE in the system is the role of the SIMD controller.

It may be beneficial and/or desirable for the SIMD controller to efficiently store the structure of both the instruction and data streams of the program. Example embodiments enable the efficient storage of instruction streams by supporting a program structure where there is one main outer loop and a number of nested and/or sequential loops. At least some programs may have a preamble section and a post-amble section where the calculation is set up and results are stored, respectively. It is to be understood that the present invention may also support programs with a sequential instruction stream(s) and no loop(s).

Each of these loops and sections of the program are stored as a separate instruction stream record that the controller uses to generate the next instruction memory address for that part of the program. To store the instruction stream, the SIMD controller records the beginning and ending location of each loop, the number of times each loop is to be executed, a value indicative of whether the loop has a child, a value indicative of whether a loop is the last child loop of its parent, and a value indicative of whether the base address of the parent loop should be loaded into the pc (program counter) when this loop is done. To improve the efficiency of the stream encoding, the beginning and ending addresses of each loop as well as each loop's iteration count may be stored as references to values stored in a set of register files. The entries in these register files can be reused by many stream records. This may allow for the number of bits used for each stream record to be greatly reduced because the register file address may be significantly smaller than the actual values used to compute each data or instruction memory address. In other words, storing in a record a pointer to the register that stores the value, rather than storing the value itself in the record, may allow for a reduction in the bits used for the record.

In an example embodiment, the loop counts of each instruction stream record are stored in a hardware stack so that the remaining number of iterations for a parent loop may be preserved while a child loop executes. However, it is to be appreciated that the loop counts of each instruction stream record may be stored in other ways. Once the child loop is done executing, its loop count (now 0) will be popped from the count stack bringing the parent's count back to the top of the stack where it can be used to determine if the parent loop is complete. The depth of the count stack hardware may determine how deeply nested loops can be (e.g., 4-entry stack allows 1 parent with 3 nested children).

To enable loops that occur in the middle of a parent's code, a flag bit (shown as the "load base" bit) may be added that indicates whether the pc should continue on after the current loop is done (the loop was in the middle of code) or the pc should be set back to the parent loops starting (base) address (the loop was at the end of the parent loop). The load base flag allows a child loop to occur in the middle or at the end of its parent's code. As an example, when this bit is high, the parent's base address will not be loaded. The parent instruction record is to be returned to before the parent's base address can be loaded. Delay circuitry may be included to delay the decision to load or not load until after the child instruction stream entry values have been changed to the parents. In other words, the delay may be used to preserve the correct choice for the child until the decision is made when the parent loop starts again.

Unlike the instruction streams which are incremental, the data stream may contain gaps where a data word is not used from memory for many cycles. The data stream may have different strides for different parts of the program, which may result in potentially many independent data streams. To store these data streams, the SIMD controller records a pc, a base, a stride, and an offset for each data memory access. As was the case with the instruction streams, the base, stride and offset values for the data stream records are stored as references to the same register files that are used by the instruction streams. In this way, the values stored in the registers may be reused as much as possible. For example, base addresses for instruction streams and data streams may be stored in the same register file (e.g., a base address register file), loop end addresses for instruction streams and offset values for data streams may be stored in the same register file (e.g., a loop end/offset register file), and loop count addresses for the instruction streams and stride values for the data streams may be stored in the same register file (e.g., a count/stride register file).

In an example embodiment, instruction addresses are issued every cycle by the SIMD controller, while data addresses are issued when a data stream record pc matches the current pc.

Streams of instructions and data are provided to each processing element in a SIMD array so that the processing elements can execute a program. Efficient encoding of the instruction and data streams and efficient computing of the individual memory addresses may be beneficial and/or desirable, particularly in applications in which the streams are stored in limited capacity memory (e.g., superconducting memory). Encoding may be optimized to reduce the memory requirements of the controller.

Inefficiencies in stream encoding or address computation typically limit the size and complexity of programs that may be stored, which in turn may limit the utility of the entire SIMD array.

Although the example embodiments of the SIMD controller are described with reference to a SIMD system, the techniques described herein for efficiently encoding and calculating streams of memory addresses may be applicable in other types of systems, such as, for example, accelerators that share many similarities with SIMD arrays.

Efficient encoding and calculation of address streams may reduce the amount of memory required to store programs. This may reduce the size and cost of the controller without compromising the utility of the SIMD array processor.

Generating the address streams for the entire SIMD array from a central controller greatly simplifies the memory interfaces on the PEs. For example, die area may be freed up that may be used to add features to the PEs.

Example embodiments use a common set of registers to store the building blocks of each address. This may help to minimize the memory requirements of a SIMD system.

The instruction and data streams records may use references to the common building block values stored in the register files.

The efficient support for nested and/or sequential loops in the instruction stream encoding is another feature that may increase the variety of program structures that can be stored and executed using the invention.

Figure 4:
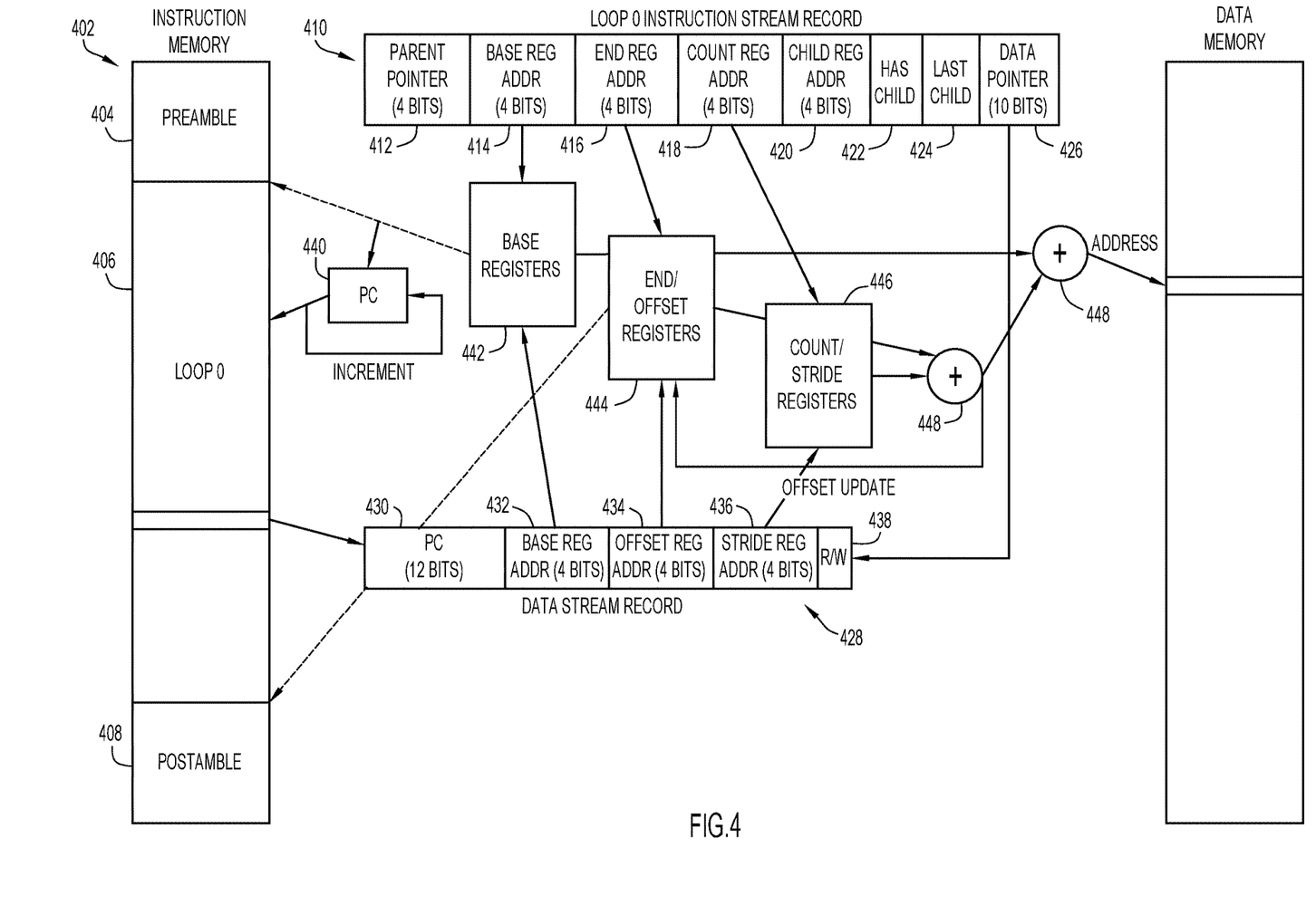
FIG. 4 is a diagram of an example program structure and encoding, according to an example embodiment.

FIG. 4 shows an example program structure storage and encoding of a program according to an example embodiment. For example, a program may be stored in an instruction memory 402. The program may have a program structure that includes a preamble 404, a loop 406, and a postamble 408. The loop may include a number of nested and/or sequential loops. Each of the sections and loops of the program may be stored as its own instruction stream record. The instruction stream records may be used to encode the various loops and/or other instructions in a program. For example, for a program having a parent loop with two child loops, three instruction stream records (one instruction stream record for the parent loop, one instruction stream record for one of the two child loops, and one instruction stream record for the other one of the two child loops) may be stored. Each loop of the program may be associated with a separate instruction stream record. In other words, a separate instruction stream record may be used for each loop. For example, loop 0 may have loop 0 instruction stream record 410. A loop may include a plurality of instructions, and each instruction of the loop may be associated with a program counter/count (PC). In an example embodiment, the PC is a register that contains the address of the (current) instruction in the program that is being executed. The PC associated with each instruction is known prior to the program being executed.

In the example shown in FIG. 4, the loop 0 instruction stream record 410 includes a parent pointer 412, a base register address 414, an end register address 416, a count register address 418, a child register address 420, a has-child bit 422, a last child bit 424, and a data pointer 426. In an example embodiment, each of the parent pointer 412, the base register address 414, the end register address 416, the count register address 418, and the child register address 420 is 4 bits, the data pointer 426 is 10 bits, and each of the has-child bit 422 and the last child bit 424 is a single bit. In an example embodiment, each instruction stream record may additionally include a load base bit (FIG. 5), which may be a single bit.

The data stream record 428 includes a program counter (PC) 430, a base register address 432, an offset register address 434, a stride register address 436, and a read/write (R/W) bit 438. Data accesses may occur for load and/or store instructions in a program. The PC 430 of a data stream record is the PC for the instruction that corresponds to the data address encoded by the data stream record.

Also shown in FIG. 4 are a PC register 440, base registers 442, end/offset registers 444, count/stride registers 446, and adders 448. The base registers 442 may store the instruction memory addresses (or values indicative of the instruction memory addresses) of the start of loops, which, for example, may be a parent loop or a child loop. The base registers 442 may additionally or alternatively store the data memory addresses (or values indicative of the data memory addresses) of data corresponding to data access instructions.

A data access may occur for a load or store in the program. The program may include instructions that are deterministic, such that data stream and instruction stream records can be generated prior to runtime. As such, the PC values for which load and store instructions occur are known prior to runtime and can be populated in their corresponding data stream records. The values that make up the data steam records and the instruction stream records may be fixed at compile time.

Streams of data accesses may have a stride of one, "walking or striding through memory," and other times may have other stride values. Stride indicates to the controller how much to increment each time. The base is the address started from. The offset allows the reuse of bases. The offset update feedback that goes back to the offset register 444 overwrites its prior stored value. The base, the offset, and the stride are added together to compute the actual address for the PE to access the data memory. The stride overwrites the offset so that is how the program is able to "walk forward." For example, for a first time, the base may be 2, the offset may be 0, and the stride may be 4, yielding an address of 6 (2+0+4=6). The next time, the base may be 2, the offset may be 4 (as the stride value was fed to the offset register), and the stride may be 4, yielding an address of 10 (2+4+4=10). This allows for striding through memory, in this example, 4 at a time.

Data stream pointer (shown in FIG. 5) points to the entry in the data stream records memory that is currently being read out.

The data address records (also referred to herein as data stream records) may be in order by PC. Incrementing the data stream pointer can move to the next data address record, and when a loop is to be repeated, the data stream pointer can be reset to the first data entry for the loop.

Look for if the address at right now is the start of a child loop, if so, increment instruction address stream to point to entry for that child loop. At child loop starting PC, increment that PC.

Figure 5:
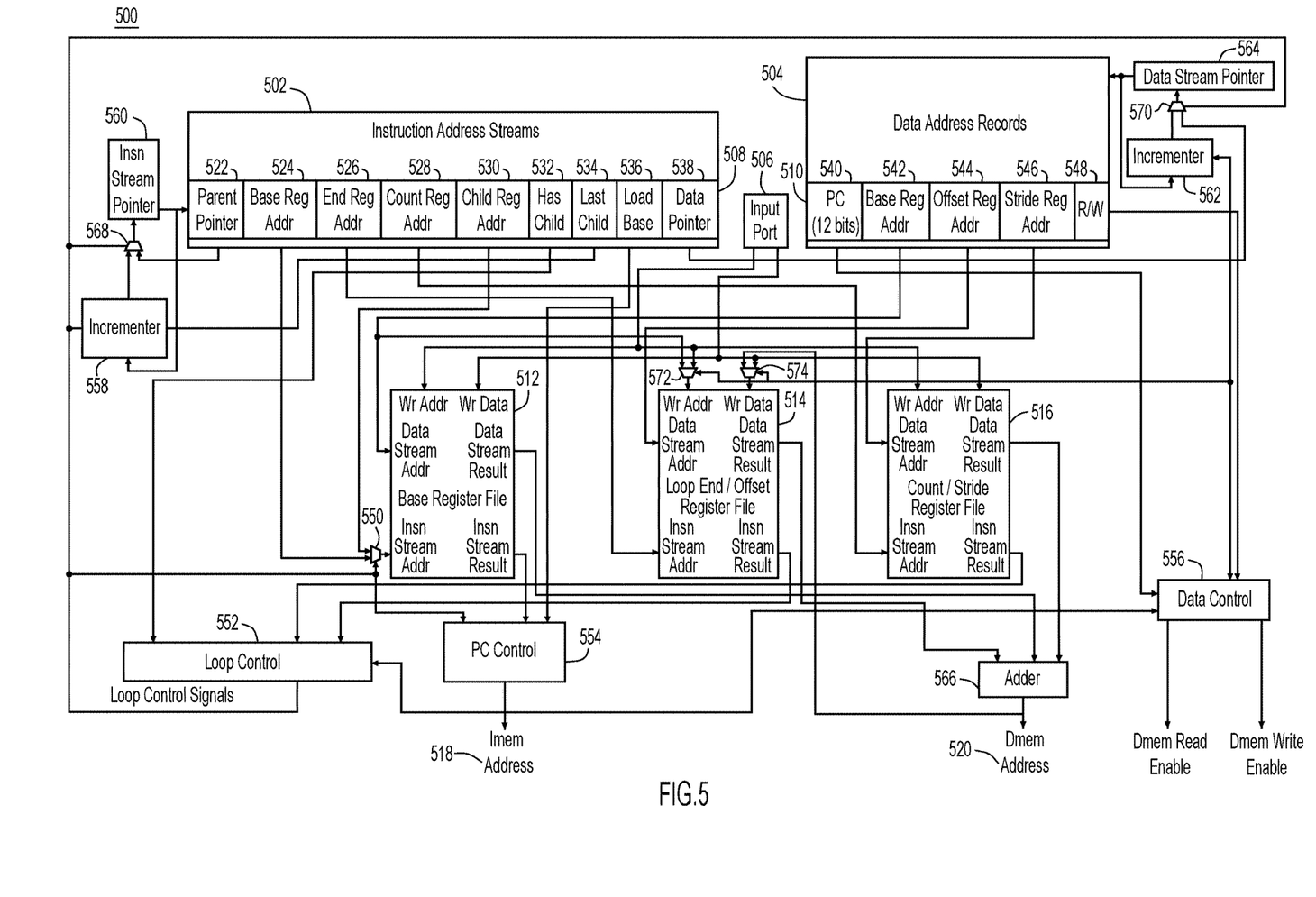
FIG. 5 is a block diagram of a SIMD controller for controlling instructions and data provided to processing elements of a SIMD computer architecture, according to an example embodiment.
Figure 6:
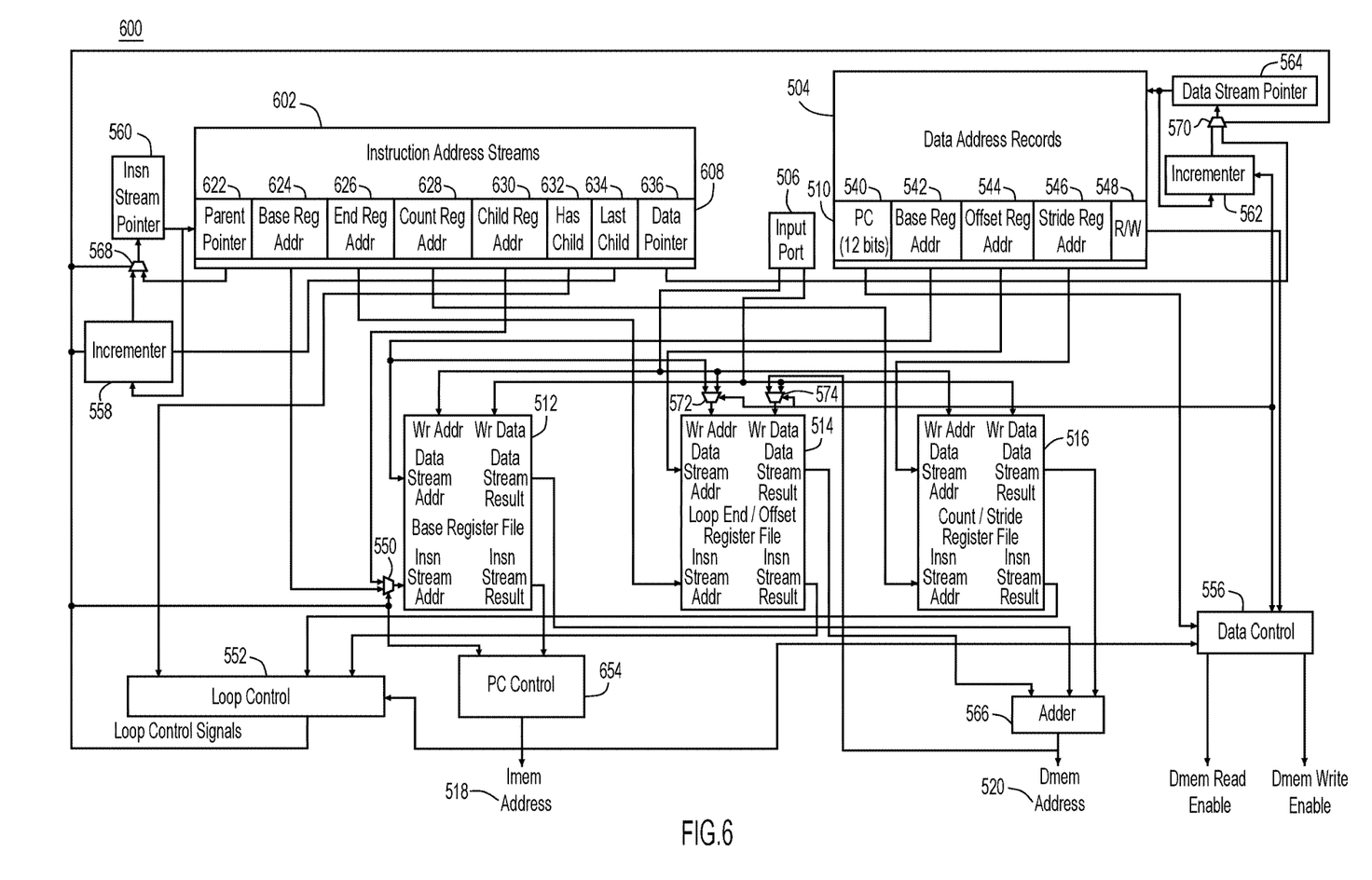
FIG. 6 is a block diagram of a SIMD controller for controlling instructions and data provided to processing elements of a SIMD computer architecture, according to another example embodiment.

FIG. 5 is a block diagram of a SIMD controller 500 for controlling instructions and data provided to processing elements of a SIMD computer architecture, according to an example embodiment. The SIMD controller 500 includes instruction address streams memory 502, data address records memory 504, and input port 506. The instruction address streams memory 502 and the data address records memory 504 may be loaded with instruction address streams 508 and data address records 510, respectively, by the input port 506. The instruction address streams 508 and the data address records 510 may be generated by software before runtime and provided to the instruction address streams memory 502 and the data address records memory 504, respectively, by the input port 506. Part of compiling the program may be generating the instruction stream records 508 and data stream records 510. Compiler/assembler programs that may be used to generate the machine code to run on the SIMD units may scan through (during the compiling and/or assembling processes) the higher-level code and identify the loops and the data accesses that are taking place in the program and generate these streams (records) based on the identified loops and data accesses. Bases and/or offsets that may also be used may be identified from this process.

The SIMD controller 500 further includes a base register file 512, a loop end/offset register file 514, and a count/stride register file 516. The instruction address streams memory 502 and data address records memory 504 are banks of memory that hold their respective records, and the records are fed into the base register file 512, the loop end/offset register file 514, and the count/stride register file 516 to construct the instruction memory address 518 and the data address memory 520.

The base register file 514 may store pc values corresponding to the start of loops. In other words, a pc corresponding to the start of a loop may be stored at a particular register address of the base register file 514. That particular register address of the base register file 514 may be stored as a value in the base register address of an instruction stream record. In other words, a pc value stored in the base register file 514 may be stored at a register having an address that corresponds to the base register address of the instruction address stream. The base register file 514 may store pcs for parent loops and/or child loops.

The PC may be computed by the controller as the program is running. The PC may also be loaded from the base register file. The base register file stores a base address that indicates where (in the instruction memory) the loop starts. For example, to load the first PC of the parent loop (stored in the base register file), that value is provide to the PC register.

To store the instruction stream, the SIMD controller 500 records the beginning and ending location of each loop, the number of times each loop is to be executed, a value indicative of whether the loop has a child, a value indicative of whether a loop is the last child loop of its parent, and a value indicative of whether the base address of the parent loop should be loaded into the pc when this loop is done. These are represented as instruction address stream records 508 (also referred to herein as instruction stream records). Each instruction address stream record 508 includes a parent pointer 522, a base register address 524, an end register address 526, a count register address 528, a child register address 530, a has-child bit 532, a last child bit 534, a load base bit 536, and a data pointer 538.

Loop instructions may have a count, which is the number of times that the loop is to be repeated before it is done. The count register address 528 may point to a register in the count/stride register file that stores a value indicative of a count of a loop encoded by its instruction stream record. The count may be decremented as the loop is executed until the count reaches a particular value (e.g., 0). The SIMD controller 500 may use a compare operation to compare the (current) count value to the particular value to determine whether the loop is done or in other words completed the number of iterations indicated by the count.

The child register address 530 points to a register in the base register file 512 that stores a value indicative of the pc of the start of a child loop.

At least the parent pointer 522, the child register address 530, the has-child marker (bit) 532, and the last child marker (bit) 534 enable nested loops to be implemented. The loop control circuitry 552 is able to determine based on the has-child marker 532 and last child marker 534 whether the nesting for a child loop is done or if there is another layer of nesting to go down into. If there is a child loop (indicated by the has-child marker 532), then the instruction pointer is incremented to go to the child loop. If the address at currently/now is a child loop, then increment the instruction address stream to point to the entry for the child loop. When a child loop is done with, the parent pointer is used to go back to the parent loop.

The loop control circuitry 552 is configured to determine whether a loop is done, and whether a child loop is starting the (current) pc. When a child loop is done, then the parent loop is returned to. The parent pointer allows the parent loop to be returned to.

The PC control circuitry 554 receives as input the instruction stream result from the base register file 512, the load base bit 536, and the loop control signals from the loop control circuitry 552 to construct the instruction memory address 518.

To store the data streams, the SIMD controller 500 records a pc 540, a base register address 542, an offset register address 544, a stride register address 546, and a read/write (R/W) bit 548 in a data address record 510.

The value of the base register address 524 is fed as a first data input to a mux 550 which feeds its output to the instruction stream address of the base register file 512. The value of the child register address 530 is fed as a second data input to the mux 550. When the base register address 526 is selected as the output for the mux 550, it is fed to the instruction stream address of the base register file 512, which stores a value (the pc corresponding to the instruction) at the value of the base register address.

The SIMD controller further includes loop control circuitry 552, PC control circuitry 554, data control circuitry 556, incrementer 558, instruction stream pointer 560, incrementer 562, data stream pointer 564, and adder 566. The loop control circuitry 552 receives as input the has-child bit 534, the output of the PC control circuitry 554, the instruction stream result output from the loop end/offset register file 514, and the output from the instruction stream result of the count/stride register file 516. The loop control circuitry 552 generates output loop control signals that are fed to selector line of the mux 550, the incrementer 558, the selector line of the mux 568, and the selector line of the mux 570. The adder 566 receives as input the data stream result from the register files 512, 514, and 516 to construct the data memory address 520.

Instruction streams have a stride of 1 and proceed sequentially. If the current address is the start of a child loop, then increment the instruction pointer via incrementer 558. This instruction pointer is selected from mux 568 in a child loop. Otherwise, the parent loop instruction pointer is selected from mux 568.

The stride for data may be different for each loop (e.g., it may be 1, 8, etc.) and the stride may be added to the offset on each occurrence of that data stream record. The sum of the offset and the stride may be saved as the new offset. As a result, each time a data stream record is used, it accesses a different piece of data that is some stride away from the last piece of data that was accessed by the data stream.

The same register file is used for (loop) counts in the instruction case, and for stride in the data case.

A compare operation may trigger the enable on the incrementer 562. The compare may determine whether the current pc value matches the pc value of the data address record. Mux 570 selects between the incremented data stream address and the data pointer from an instruction stream record.

The output of the mux 570 is fed to the data stream pointer 564, which points to the entry in the data address records 510 that is currently being read out. The data stream pointer 564 is also fed back to the incrementer 562.

Data control circuitry 556 controls whether or not the data memory write and/or data memory read is/are enabled. The data control circuitry 556 receives as input the pc 540 and the R/W bit 548 from the currently selected data address record 510 as well as the output from the PC control 554.

Mux 572 selects between the base register address 542 and the address output from the input port 506. The output of the mux 572 is input to the write address (shown as Wr Addr) of the loop end/offset register file 514.

Mux 574 selects between the data output from the input port 506 and the output from the adder 566. The output of the mux 574 is input to the write data (shown as Wr Data) of the loop end/offset register file 514.

FIG. 6 is a block diagram of a SIMD controller 600 for controlling instructions and data provided to processing elements of a SIMD computer architecture, according to another example embodiment. The SIMD controller 600 may be the same as the SIMD controller 500 except the SIMD controller 600 does not include a load base entry in its instruction address records. As shown in FIG. 6, each instruction address stream record 608 of instruction address stream memory 602 includes a parent pointer 622, a base register address 624, an end register address 626, a count register address 628, a child register address 630, a has-child bit 632, a last child bit 634, and a data pointer 636.

As described above, a load base bit or entry may be added to enable loops that occur in the middle of a parent's code. For programs that do not include such loops, a load base entry is not needed, and PC control circuitry 654 receives as input the instruction stream result from the base register file 512 and the loop control signals from the loop control circuitry 552 to construct the instruction memory address 518.

It will be appreciated that SIMD controllers 500 and 600 may be configured to perform the method 300 illustrated in FIG. 3 or any other method for processing data in a SIMD computer architecture.

Figure 7:
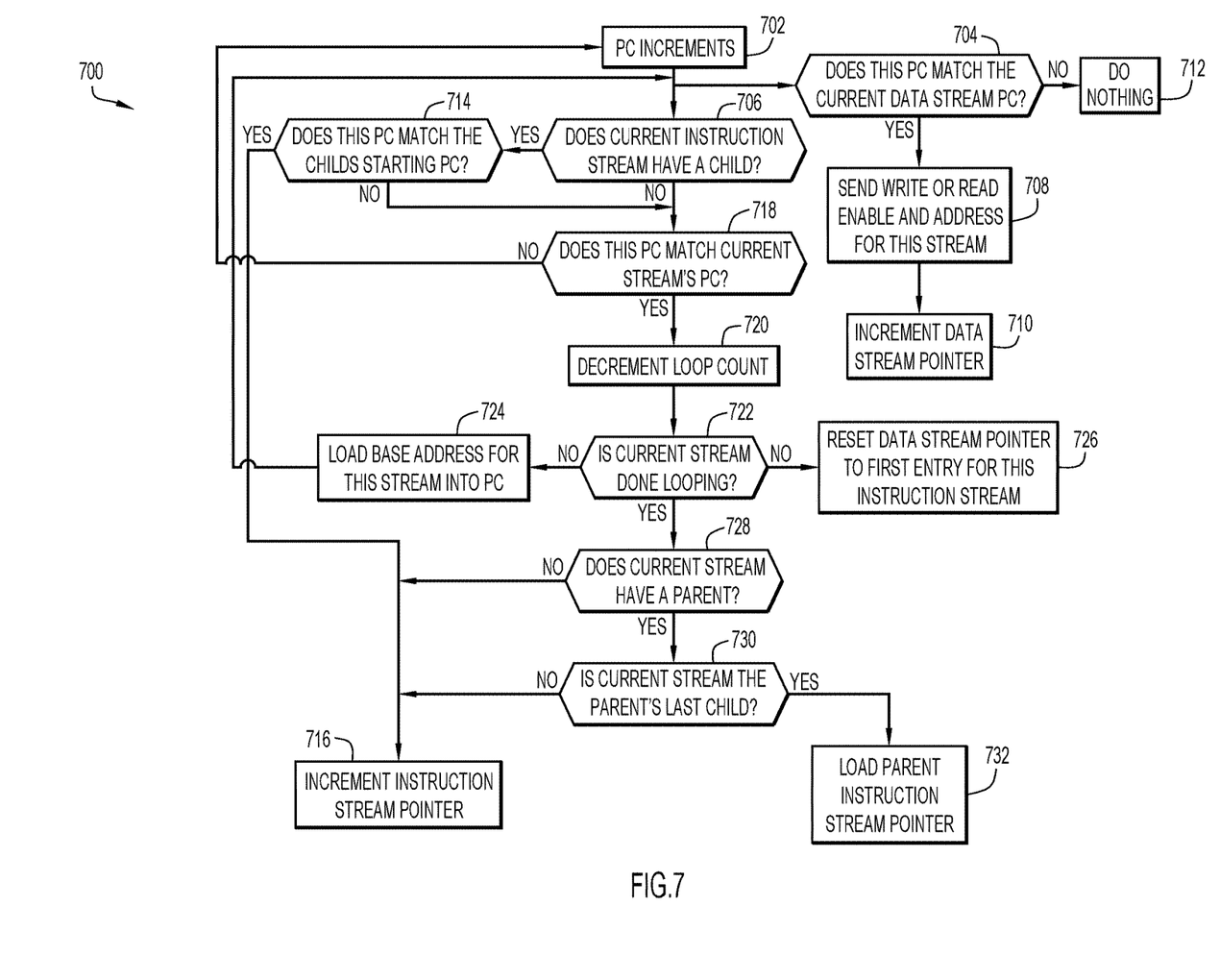
FIG. 7 is a flowchart illustrating a method for controlling instructions and data provided to processing elements of a SIMD computer architecture, according to an example embodiment.

FIG. 7 is a flowchart illustrating a method 700, according to an example embodiment. The method 700 may be performed by a SIMD controller (e.g., SIMD controller 500, SIMD controller 600). It will be appreciated that some operations of the method may be performed in parallel. At 702, the SIMD controller increments a program count (PC) to a value of the address of the next instruction to be fetched.

At 704, the SIMD controller determines whether this PC matches the current data stream PC. For example, the controller makes this determination by comparing the PC and the current data stream PC. If at 704 the PC does match the current data stream PC, then the method 700 continues to 708 where the write or read enable and address for this stream are sent and to 710 the data stream pointer is incremented. If at 704 the PC does not match the current data stream PC, then the method 700 continues to 712 where the write or read enable and address for this stream are not sent and the data stream pointer is not incremented (shown as "do nothing").

At 706, the SIMD controller determines whether the current instruction stream has a child. If the current instruction stream does have a child, then at 714 the SIMD controller determines whether the PC matches the starting PC of the child. If at 714 the PC matches the child's starting PC, then at 716 the instruction stream pointed is incremented. If at 714 the PC does not match the starting PC of the child, then at 718 the SIMD controller determines whether the PC matches the current stream's ending PC. If the PC matches the current stream's ending PC, then at 720 the loop count is decremented and the method 700 continues to 722. If the PC does not match the current stream's ending PC, then the method continues (or returns) to 702 where the PC is incremented.

At 722, the SIMD controller determines if the current stream is done looping. If not, then at 724 the base address for this steam is loaded into PC and at 726 the data stream pointer is reset to the first entry for this instruction stream. If the current stream is done looping, then the method 700 continues to 728 where it is determined if the current stream has a parent. If the current stream does have a parent, then it is determined at 730 whether the current stream is the parent's last child. If it is not, the instruction stream pointer is incremented 716. If it is, the parent instruction stream pointer is loaded 732.

It will be appreciated that the example embodiments described above and illustrated in the drawings represent only a few of the many ways of implementing the invention. Many modifications and variations will be apparent to those of ordinary skill in the art without departing from the scope and spirit of the invention.

What is claimed is:

1. A method for processing data in a single instruction multiple data (SIMD) computer architecture that supports if-else-based program structures and loop-based program structures, the method comprising:
   receiving at a processing element a masking instruction that includes an opcode and a predication mask including a plurality of bits associated with a plurality of predicated instructions following the masking instruction;
   determining by the processing element, based on the opcode of the masking instruction, a predication state indicative of one of a conditional predication mode for supporting the if-else-based program structures and an absolute predication mode for supporting the loop-based program structures, wherein, for the conditional predication mode, the plurality of bits of the predication mask indicate a result for a prior comparison to commit a corresponding computation for an if-else-based program structure, and wherein, for the absolute predication mode, the plurality of bits of the predication mask indicate whether to commit the corresponding computation for a loop iteration;
   storing in a predication mask register the predication mask;
   storing in a predication state register a value indicative of the predication state;
   receiving at the processing element a first predicated instruction of the plurality of predicated instructions; and
   determining by the processing element, based on a value of a head bit of the plurality of bits of the predication mask stored in the predication mask register and on the value indicative of the predication state stored in the predication state register, whether to commit a computation corresponding to execution of the first predicated instruction, wherein determining whether to commit the computation comprises:
      in response to the predication state indicating the absolute predication mode, committing the computation based on the head bit of the plurality of bits of the predication mask indicating that the computation is to be committed; and
      in response to the predication state indicating the conditional predication mode, committing the computation based on the result of the prior comparison matching the head bit of the plurality of bits of the predication mask.

2. The method of claim 1, wherein determining the predication state comprises determining a value of the opcode of the masking instruction, wherein the value is a first value when the opcode of the masking instruction corresponds to the conditional predication mode and the value is a second value when the opcode of the masking instruction corresponds to the absolute predication mode.

3. The method of claim 1, wherein the result of the prior comparison is stored in a compare result register.

4. The method of claim 1, wherein determining whether to commit the computation is further based on an instruction predication bit corresponding to the first predicated instruction.

5. The method of claim 4, wherein the instruction predication bit is a first value when the instruction is predicated and is a second value when the instruction is not predicated.

6. The method of claim 1, wherein determining whether to commit the computation further comprises determining a register file write bit is enabled.

7. The method of claim 1, further comprising:
   receiving at the processing element a second predicated instruction of the plurality of predicated instructions; and
   determining by the processing element, based on an updated value of the head bit of the plurality of bits of the predication mask stored in the predication mask register and on a next value indicative of the predication state stored in the predication state register, whether to commit a computation corresponding to execution of the second predicated instruction.

8. The method of claim 7, wherein determining whether to commit the computation corresponding to execution of the second predicated instruction is further based on an instruction predication bit corresponding to the second predicated instruction.

9. The method of claim 1, wherein determining whether to commit the computation further comprises discarding the computation when a register file write bit is disabled.

10. A single instruction multiple data (SIMD) processing system comprising:
    a plurality of processing elements; and
    a single instruction multiple data (SIMD) controller to provide to the plurality of processing elements instruction and data memory addresses for instructions of a program executed by the plurality of processing elements, the SIMD controller comprising:
       an input port to load a plurality of data address records and a plurality of instruction address stream records, wherein code of the program is scanned to identify loops and data accesses to generate the plurality of data address records and the plurality of instruction address stream records prior to runtime of the program;
       a plurality of registers, each register storing a value used in determining one or more from a group of an instruction memory address at which an instruction is stored and a data memory address at which data corresponding to the instruction is stored;
       a data memory communicatively coupled to the plurality of registers and storing the plurality of data address records, each data address record comprising a program counter value and a plurality of register addresses each identifying a corresponding one of the plurality of registers that stores a value used to determine a data memory address, wherein values used to determine the data memory address include a base address, an offset, and a stride;
       an instruction address stream memory communicatively coupled to the plurality of registers and storing the plurality of instruction address stream records associated with nested loops and other sections of the program, each instruction address stream record corresponding to one of a loop and other section of the program and comprising a plurality of register addresses each identifying a corresponding one of the plurality of registers that stores a value used to determine an instruction memory address storing a corresponding instruction, wherein values used to determine the instruction memory address include a beginning and ending location of each loop, number of times of execution of each loop, and indicators pertaining to parent and child loops; and hardware to build and provide to the plurality of processing elements the instruction and data memory addresses for the instructions of the program executed by the plurality of processing elements based on the data address records and the instruction address stream records, the hardware configured to:

set a program counter to an instruction memory address of a program instruction to be executed by the processing elements;

determine that the program counter matches the program counter value of a corresponding data address record and combine the base address, the offset, and the stride associated with the corresponding data address record to generate the data memory address for the program instruction; and modify the program counter to an instruction memory address of a next program instruction according to the instruction address stream records associated with the program instruction, wherein modifying the program counter comprises:

when the program instruction is at an end of an exhausted last child loop of a parent loop based on the indicators pertaining to parent and child loops, setting the program counter to the beginning location of that parent loop.

11. The SIMD processing system of claim 10, wherein modifying the program counter comprises incrementing the program counter the instruction memory address of the next instruction.

12. The SIMD processing system of claim 10, wherein the instruction address stream memory is configured to store one or more bits indicative of whether an instruction of the program has a child loop.

13. The SIMD processing system of claim 12, wherein for an instruction that has a child loop, the plurality of register addresses includes a child register address that identifies an address of a register that points to a start of the child loop.

14. The SIMD processing system of claim 13, wherein the instruction address stream memory is configured to store one or more bits indicative of whether a child loop is a last child loop of a corresponding parent loop.

15. The SIMD processing system of claim 10, wherein at least one of the register addresses includes a pointer to a parent loop of a child loop.

16. The SIMD processing system of claim 10, wherein at least one instruction address stream record encodes an instruction loop.

17. The SIMD processing system of claim 16, wherein the instruction loop includes a plurality of nested loops.

18. The SIMD processing system of claim 10, wherein modifying the program counter comprises updating the program counter according to a memory address of where a loop starts.

* * * * *